（12）United States Patent
Kamigawara et al.

(10) Patent No.: US 10,464,165 B2
(45) Date of Patent: Nov. 5, 2019

(54) COMBINED MACHINING APPARATUS HAVING A LASER MACHINING HEAD

(71) Applicant: NAKAMURA-TOME PRECISION INDUSTRY CO., LTD., Hakusan, Ishikawa (JP)

(72) Inventors: Atsushi Kamigawara, Kanazawa (JP); Takashi Miyamoto, Kanazawa (JP); Naoto Masuko, Hakusan (JP)

(73) Assignee: NAKAMURA-TOME PRECISION INDUSTRY CO., LTD., Hakusan (JP)

( * ) Notice: Subject to any disclaimer, the term of this patent is extended or adjusted under 35 U.S.C. 154(b) by 121 days.

(21) Appl. No.: 15/664,309

(22) Filed: Jul. 31, 2017

(65) Prior Publication Data

US 2018/0036835 A1 Feb. 8, 2018

(30) Foreign Application Priority Data

Aug. 2, 2016 (JP) ................................. 2016-152210
Mar. 13, 2017 (JP) ................................. 2017-047620

(51) Int. Cl.
*B23K 26/00* (2014.01)
*B23P 23/04* (2006.01)
(Continued)

(52) U.S. Cl.
CPC .......... *B23K 26/0093* (2013.01); *B23B 3/065* (2013.01); *B23K 26/08* (2013.01); *B23K 26/1482* (2013.01); *B23K 26/702* (2015.10); *B23P 23/04* (2013.01); *B23Q 3/155* (2013.01); *B23Q 3/157* (2013.01); *B23Q 3/15513* (2013.01); *B23Q 3/15539* (2016.11);
(Continued)

(58) Field of Classification Search
CPC .............. B23Q 3/1556; B23Q 3/15566; B23Q 3/15573; Y10T 483/1702; Y10T 483/1705; Y10T 483/1707; Y10T 483/1714–1726; Y10T 483/1733–1798; B23K 26/0093; B23K 26/702; B23K 26/0648; B23K 26/1482
USPC ....................................... 219/121.67, 121.84
See application file for complete search history.

(56) References Cited

U.S. PATENT DOCUMENTS 4,596,502 A * 6/1986 Cattani .................. B23B 29/04
408/234
5,490,307 A 2/1996 Link
(Continued)

FOREIGN PATENT DOCUMENTS

JP H06339785 A 12/1994
JP H11138373 A 5/1999
(Continued)

OTHER PUBLICATIONS

Jan. 31, 2018 Extended European Search Report issued in Eurpoean Application No. 17184181.0.

*Primary Examiner* — Erica E Cadugan
*Assistant Examiner* — Yasir A Diab
(74) *Attorney, Agent, or Firm* — Oliff PLC (57) ABSTRACT

A combined machining apparatus includes a tool holder, a first automatic exchanger capable of containing at least one laser machining head and mounting the at least one laser machining head on the tool holder, and a second automatic exchanger capable of containing at least one mechanical machining tool and mounting the at least one mechanical machining tool on the tool holder.

6 Claims, 8 Drawing Sheets

(51) Int. Cl.
  *B23Q 3/155* (2006.01)
  *B23Q 3/157* (2006.01)
  *B23B 11/00* (2006.01)
  *B23K 26/70* (2014.01)
  *B23B 3/06* (2006.01)
  *B23K 26/08* (2014.01)
  *B23K 26/14* (2014.01)

(52) U.S. Cl.
  CPC ....... *B23Q 3/15713* (2013.01); *Y10T 29/5114* (2015.01); *Y10T 483/17* (2015.01); *Y10T 483/1705* (2015.01)

(56) References Cited

U.S. PATENT DOCUMENTS

| | | | |
|---|---|---|---|
| 6,593,541 B1 | 7/2003 | Herren | |
| 2008/0099452 A1* | 5/2008 | Akiyama | B23K 26/1482 219/121.67 |
| 2009/0179014 A1* | 7/2009 | Erlenmaier | B23K 26/1482 219/121.67 |
| 2009/0181838 A1* | 7/2009 | Schmauder | B23K 26/1482 483/16 |

FOREIGN PATENT DOCUMENTS

| | | |
|---|---|---|
| JP | 2002-515344 A | 5/2002 |
| JP | 2002321139 A | 11/2002 |
| WO | 99-59765 A1 | 11/1999 |
| WO | 2015022369 A1 | 2/2015 |

\* cited by examiner

COMBINED MACHINING APPARATUS HAVING A LASER MACHINING HEAD

CROSS REFERENCES TO RELATED APPLICATIONS

Japanese Patent Application No. 2016-152210 filed on Aug. 2, 2016 and Japanese Patent Application No. 2017-047620 filed on Mar. 13, 2017 are hereby incorporated by reference in their entirety.

BACKGROUND

The present invention relates to a combined machining apparatus having combined functions of laser machining using a laser beam and mechanical machining for cutting, grinding, and the like.

A laser beam is generally used for various kinds of laser machining such as cutting, boring, welding, building, laminating, surface modifying, etc. Conventionally, however, different types of laser machining apparatuses are provided in accordance with the applications of machining. Therefore, users may need to install a number of laser machining apparatuses depending on their applications. Thus, users may need to prepare a relatively large space and bear a relatively high cost.

In addition, when a work is in a relatively poor condition, for example, mechanical machining such as cutting and grinding may be needed before and/or after the laser machining.

Japanese Unexamined Patent Application Publication No. 2002-515344 discloses a technique for attaching a laser machining head to a headstock of a machine tool by using a rotation mechanism. This technique, however, does not automatically exchange a laser machining head with a mechanical machining tool.

SUMMARY

Accordingly, it is an object of the present invention to provide a combined machining apparatus having combined functions of laser machining using a laser beam and mechanical machining for cutting, grinding, and the like.

According to one aspect of the invention, there is provided a combined machining apparatus, comprising:

a tool holder;

a first automatic exchanger capable of containing at least one laser machining head and mounting the at least one laser machining head on the tool holder; and a second automatic exchanger capable of containing at least one mechanical machining tool and mounting the at least one mechanical machining tool on the tool holder.

A combined machining apparatus includes a laser machining head held by a tool holder for machining a work, and a mechanical machining tool. The tool holder (e.g., a tool main shaft) securely holds the laser machining head or mechanical machining tool with a chuck mechanism and controls rotation of these tools if necessary.

The laser machining head is referred to as a head that irradiates the work with a laser beam to perform various kinds of laser machining on the work, such as cutting, boring, welding, building, laminating, surface modifying, etc.

The mechanical machining tool is referred to as a tool that performs various mechanical machining on the work, such as turning machining with a turning tool, cutting machining with a rotating tool, grinding machining with a grinding tool such as grinding stone.

In the present invention, the combined machining apparatus includes the first and second automatic exchangers for the laser machining head and the mechanical machining tool so as to make the laser machining in synchronization with the mechanical machining to be performed before or after the laser machining. That is, it becomes possible that one unit of the combined machining apparatus performs a plurality of machining steps. Therefore, such a combined machining apparatus is capable of being used in a wide range of machining applications and reducing a total cost.

In the combined machining apparatus, wherein the at least one laser machining head includes a first shank for being held by the tool holder, and the at least one mechanical machining tool includes a second shank for being held by the tool holder, wherein the first shank may include a first portion to be held by the tool holder and the second shank includes a second portion to be held by the tool holder, and wherein the first and second portions may be formed in a common shape.

In this way, the tool holder can alternatively hold the laser machining head and the mechanical machining tool by securely holding the first and second shanks.

In the combined machining apparatus, wherein the at least one laser machining head may include a collimator that collimates a laser beam, and a plurality of light condensers having different focal lengths for the laser beam, and wherein each of the plurality of the light condensers may be capable of being attached to and detached from the collimator.

Thus, one collimator can be shared with a plurality of the laser machining heads.

In the combined machining apparatus, wherein the first automatic exchanger may be capable of containing the plurality of the light condensers and mounting one of the plurality of the light condensers on the collimator held by the tool holder.

In this way, the first automatic exchanger stocks various kinds of the light condensers, and exchanges the light condenser held by the tool holder with one of the stocked light condensers. Thus, the combined machining apparatus can perform various kinds of laser machining.

In the combined machining apparatus, wherein the plurality of the light condensers correspond to different laser machining may purpose including cutting, boring, welding, building, laminating, and surface modifying.

In addition, the laser machining head is capable of containing a material supply portion, in a unit form, for supplying an assist gas, a shield gas, and a powder and line material to be used for machining of building and welding. Such a unitized laser machining head containing the material supply portion can be securely mounted on the tool holder and exchanged with other machining tools.

In the combined machining apparatus, wherein the at least one laser machining head may include an attachment that forms a laser beam path and includes the first shank.

Thereby, the first shank provided to the attachment that forms the laser beam path allows the laser machining head to be securely attached to and detached from the tool holder.

It should be noted here that the laser light path may include a transmission fiber and, if necessary, mirrors for reflection and changing of a light beam.

In the combined machining apparatus, wherein the tool holder may include a tool main shaft for rotating the at least one mechanical machining tool, and the tool main shaft includes a sub-clamp for clamping the attachment.

In the combined machining apparatus, wherein the tool holder may include a tool main shaft for rotating the at least one mechanical machining tool, and the attachment includes a sub-clamp for being clamped by the tool main shaft.

In this way, it becomes possible to stably mount the laser machining head, which is relatively heavier than the mechanical machining tool, to the tool main shaft.

DESCRIPTION OF PREFERRED EMBODIMENTS

An exemplary structure of a combined machining apparatus according to a first embodiment of the present invention is explained hereafter with referring to accompanying drawings; however, the present invention is not limited to it.

Figure 1:
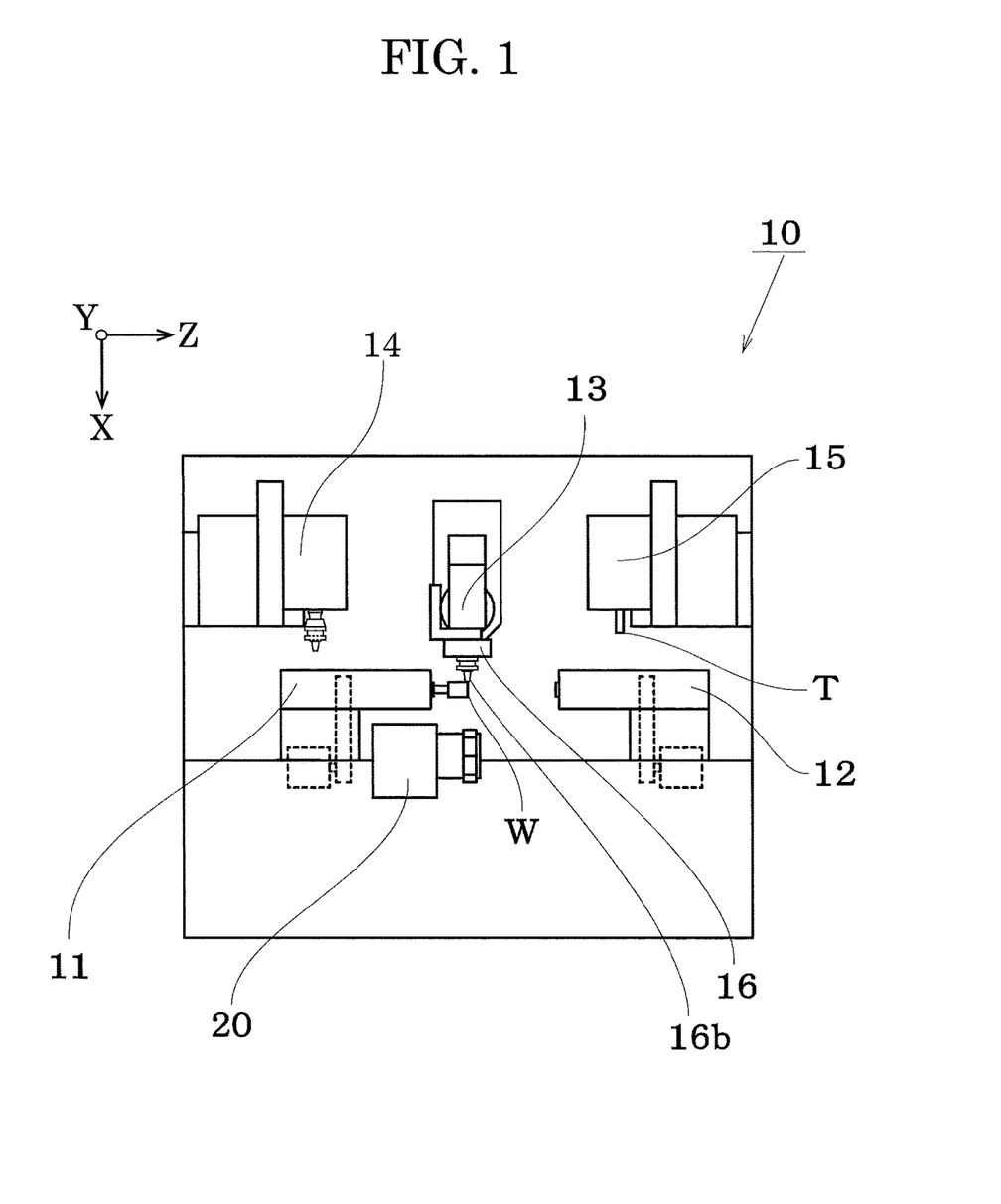
FIG. 1 illustrates an exemplary structure of a combined machining apparatus according to an embodiment of the present invention.

FIG. 1 illustrates an exemplary structure of a combined machining apparatus 10.

The combined machining apparatus 10 includes a headstock L 11 and a headstock R 12 which are disposed opposing to each other, and each of which is capable of holding a work W with a chuck mechanism and of being controlled for spinning. The combined machining apparatus further includes a tool main shaft 13 for serving as a tool holder arranged at a position directly above the headstock L 11 and the headstock R 12.

The combined machining apparatus 10 further includes a laser machining head exchanger (referred to as a first automatic exchanger) 14, an automatic tool exchanger (referred to as a second automatic exchanger) 15, a laser machining head 16 having a laser beam condenser 16b, and a capstan rest 20.

In FIG. 1, a Z axis is applied to a direction of an axis line of the opposing headstock L 11 and headstock R 12, an X axis is applied to a depth feed direction of the tool main shaft 13, and a Y axis is applied to a direction orthogonal to the X and Z axes.

At least one of the opposing headstock R 11 and headstock R 12 is controlled to move in the Z axis direction.

The tool main shaft 13 is controlled for rotation at least around the Y axis (i.e., a B-axis control) and exchange mechanical machining tools and laser machining head with the first and second automatic exchangers 14 and 15, which are disposed opposing to each other, as illustrated in FIG. 1. The main tool shaft 13 receives or gives over the laser machining head 16 from or to the first automatic exchanger 14, and receives or gives over a mechanical machining tool T from or to the second automatic exchanger 15.

Although explanation and illustration for detailed structures are omitted, it is possible to apply structures of a finger type, arm type, or any other type exchanger, which are known, to the first and second automatic exchangers 14 and 15 so that the first and second automatic exchangers 14 and 15 can automatically exchange the laser machining head 16 or the mechanical machining tool T with the main tool shaft 13.

Figure 2:
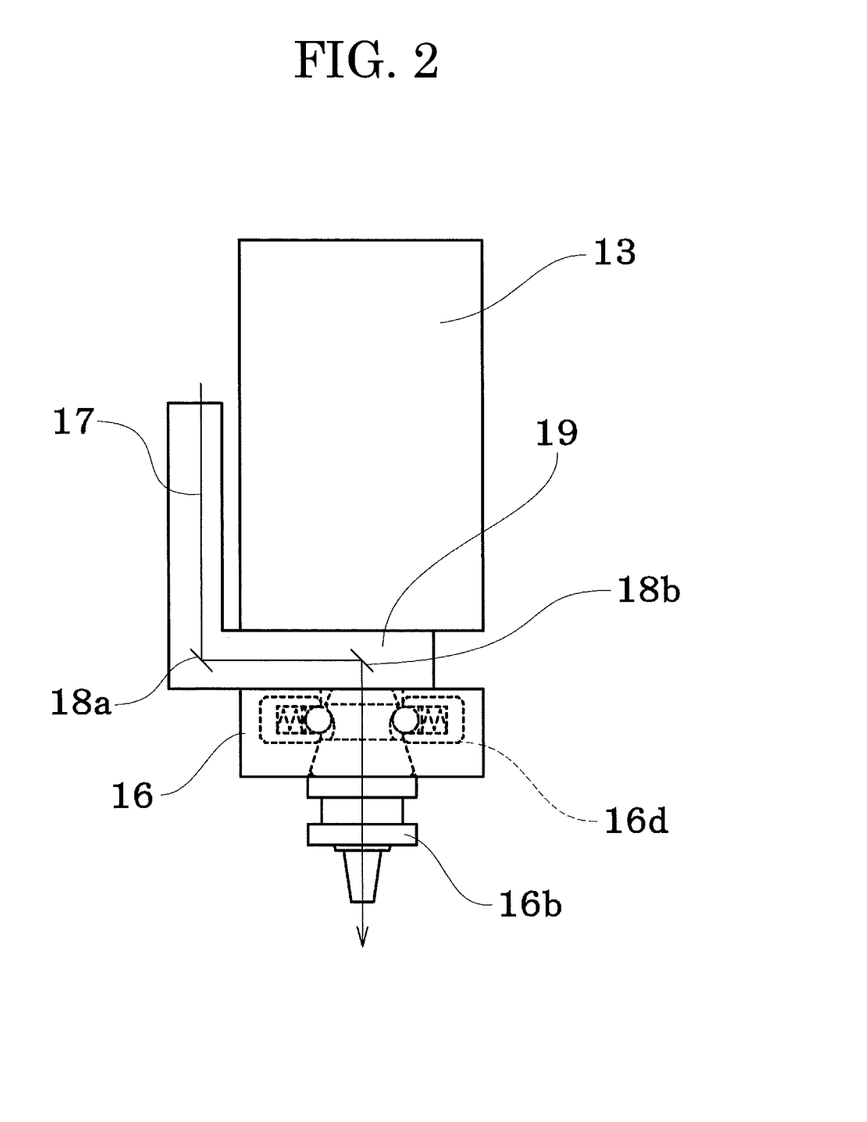
FIG. 2 illustrates an exemplary state in which a laser machining head is mounted on a tool main shaft.

In FIG. 2, the laser machining head 16 is made in a unit form in which an assist gas tube, a shield gas tube, a powder and line material supplier, and so on are combined together. The first automatic exchanger 14 may be provided with at least one unit of the laser machining head 16, or preferably be provided with a magazine in which a plurality of such laser machining units designed for various machining purposes is installed.

Figure 3A:
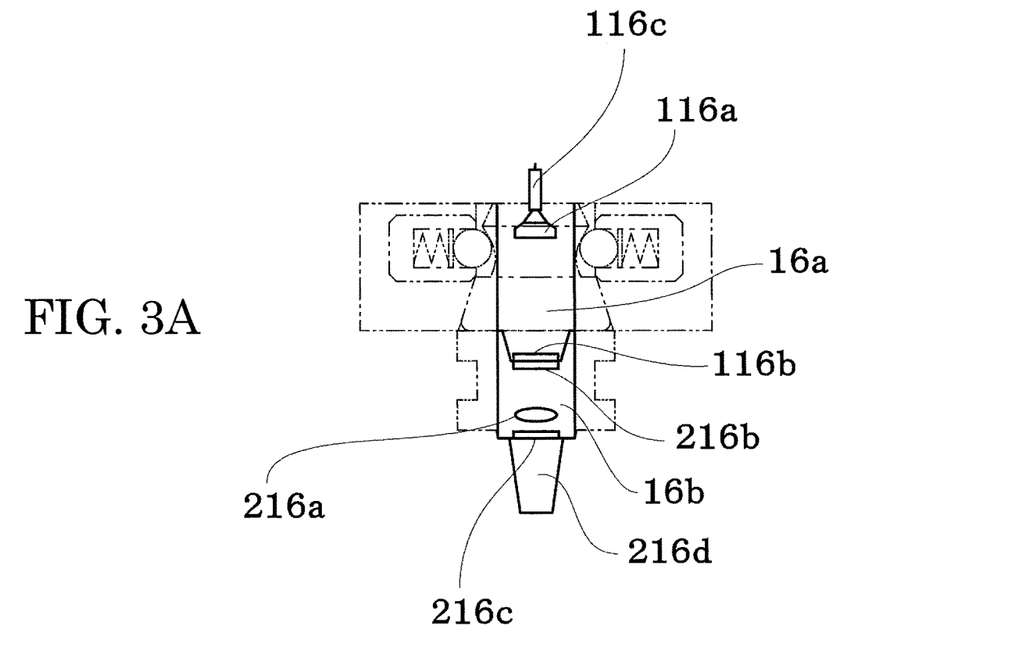
FIG. 3A illustrates an exemplary state in which a laser beam condenser is mounted on a collimator.
Figure 3B:
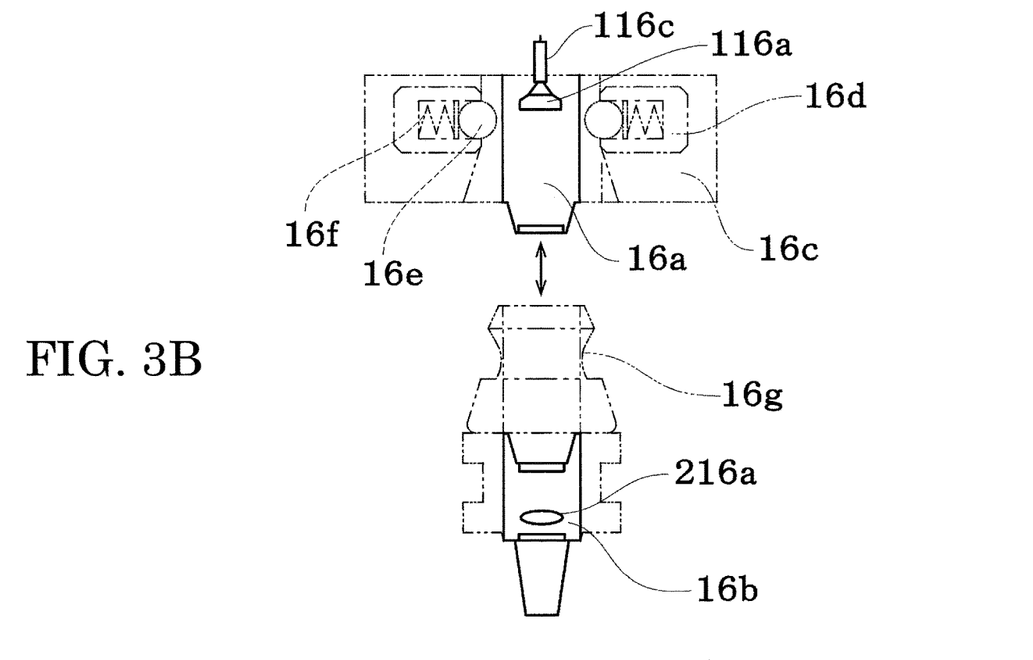
FIG. 3B illustrates an exemplary state in which the laser beam condenser is dismounted from the collimator.

In the present embodiment, as illustrated in FIGS. 2, 3A, and 3B, the laser machining head 16 further has a collimator 16a and, particularly illustrated in FIG. 3B, the collimator 16a and the laser beam condenser 16b are attachable to and detachable from each other. The first automatic exchanger 14 is provided with a magazine in which a plurality of laser beam condensers 16b designed for various machining purposes and having different light condensing methods and different condensing distance is installed.

The collimator 16a serves as an optical system for collimate the laser beam and functions as a common part for a plurality of different kinds of the laser machining heads 16. The laser beam condenser 16b has properties such as a light condensing method and condensing distance which are adjusted for each of a plurality of laser machining heads 16 in accordance with the purposes of laser machining such as cutting, boring, welding, building, laminating, surface modifying, etc.

With this structure, the first automatic exchanger 14 can be provided with a magazine equipped with a plurality of the laser beam condensers 16b each having different properties, and it becomes possible to perform various kinds of laser machining by activating the first automatic exchanger 14 to exchange the laser beam condenser 16b mounted on the main tool shaft 13.

As described above, the collimator 16a and the laser beam condenser 16b are separable, and any methods for such separation can be adoptable without limitation.

In the present embodiment, as illustrated in FIG. 3B, the laser machining head 16 further includes a chuck part 16c and three ball plungers 16d each having balls 16e and springs 16f. Three ball plungers 16d serve as a three-point suspension system and are disposed at the collimator 16a's side along the circumference. The laser beam condenser 16b has a chuck neck 16g formed with portions of upward and downward conical shapes connected together along the circumference. The chuck neck 16g is inserted into the ball plungers 16d to be mounted and is drawn from the ball plungers 16d to be dismounted.

In each of the ball plungers 16d, the ball 16e is energized to form a projection towards the center along the circumference by the spring 16f so as to securely hold the laser beam condenser 16b.

The three ball plungers 16d are disposed with 120° angular intervals along the circumference so as to the axis center of the collimator 16a agrees with the axis center of the laser beam condenser 16b, i.e., laser beam axis.

Alternatively, the laser machining head 16 may be provided with, for example, a rotary lock mechanism with a key and a key slot so that the laser beam condenser 16b does not rotate relative to the collimator 16a.

As illustrated in FIGS. 3A and 3B, the collimator 16a includes a collimator lens 116a, a protection glass (referred to as a first glass) 116b, and a transmission fiber 116c for transmitting laser beams, and the laser beam condenser 16b includes a condenser lens 216a, another protection glass (referred to as a second glass) 216b, further another protection glass (referred to as a third glass) 216c, and a nozzle 216d. Alternatively, when the laser beam condenser 16b is capable of being attachable to and detachable from the collimator 16a for exchange, the collimator 16a and the laser beam condenser 16b may have structures other than those described above.

As illustrated in FIG. 2, the laser machining head 16 further includes an attachment 19 for holding the laser machining head 16 and mounting it to the tool main shaft 13. The attachment 19 includes reflection mirrors 18a and 18b. The laser machining head 16 is capable of positioning the reflection mirrors 18a and 18b so that the axis center of the tool main shaft 13 agrees with the axis center of a laser beam 17. Alternatively, as illustrated in FIG. 4, the laser machining head 16 may have a structure in which a light axis of the laser beam 17 is offset from the axis center of the tool main shaft 13.

Figure 4:
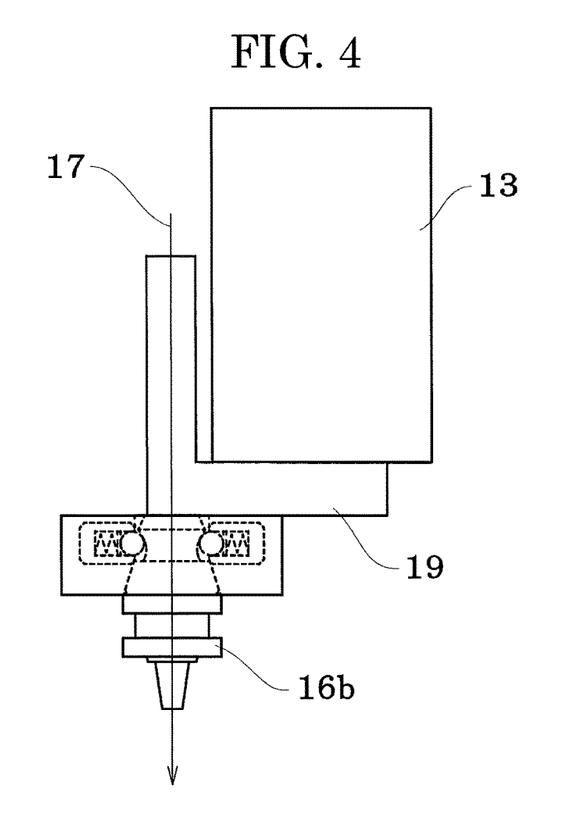
FIG. 4 illustrates an exemplary state in which a laser beam axis is offset from a shaft center of the tool main shaft.
Figure 5A:
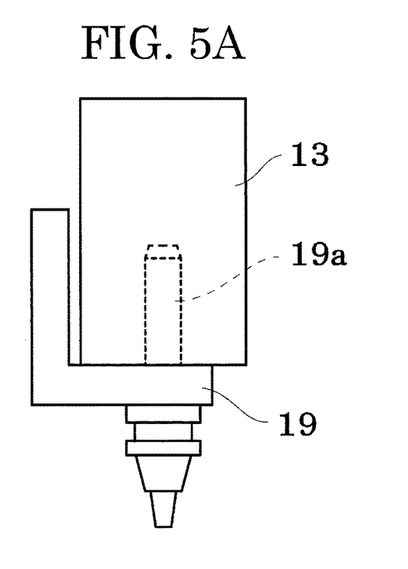
FIGS. 5A and 5B illustrate exemplary structural views in which the laser machining head is mounted on the tool main shaft.
Figure 5B:
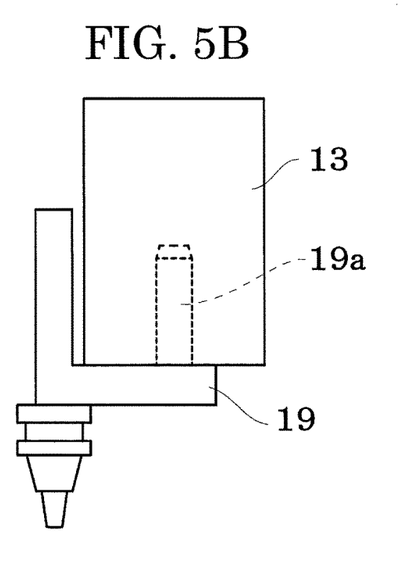

The attachment 19 of FIGS. 2 and 4 includes, as illustrated in FIGS. 5A and 5B, a shank (referred to as a first shank) 19a for being securely held by the tool main shaft 13 with a chuck mechanism. The shank 19a has a portion to be securely held by the tool main shaft 13 in the chuck mechanism, and such a portion of the shank 19a is formed in a shape substantially common to a shape of a corresponding portion of a shank (referred to as a second shank and not shown) provided to the mechanical machining tool T that is carried by the second automatic exchanger 15. Accordingly, the mechanical machining tool T and the attachment 19 for holding the laser machining head 16 are selectively attached to the tool main shaft 13. The first automatic exchanger 14 carries the attachment 19 and causes it to be attached to and detached from the tool main shaft 13. One of a plurality of the laser beam condensers 16b is alternatively caused to be attached to and detached from the collimator 16a held by the attachment 19. Removal of the laser machining head 16 from the tool main shaft 13 can be carried out by detaching the attachment 19 from the tool main shaft 13.

When the laser machining head 16 is detached from the tool main shaft 13, the second automatic exchanger 15 of FIG. 1 mounts the mechanical machining tool T, such as a cutting tool or a turning tool, to the tool main shaft 13. Thereby, it becomes possible to perform various kinds of cutting machining.

In the present embodiment, as illustrated in FIG. 1, the capstan rest 20 equipped with a turret having in a radially-arranged layout a plurality of cutting tools (i.e., mechanical machining tools) is disposed at a position under the headstock L 11 and the headstock R 12, and provides one of the plurality of the cutting tools by rotatively changing the position of the turret. Alternatively, it may be possible to provide a plurality of the capstan rest 20 or another type of a capstan rest serving under the B-axis control (i.e., a rotary control along the Y axis), if necessary.

Figure 6A:
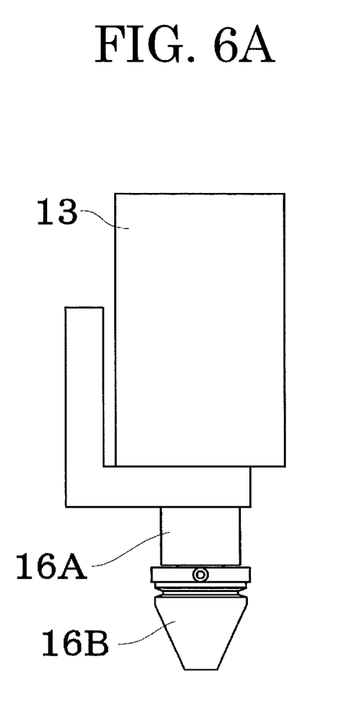
FIG. 6A illustrates a state in which another laser machining head according to a second embodiment is mounted on a tool main shaft.
Figure 6B:
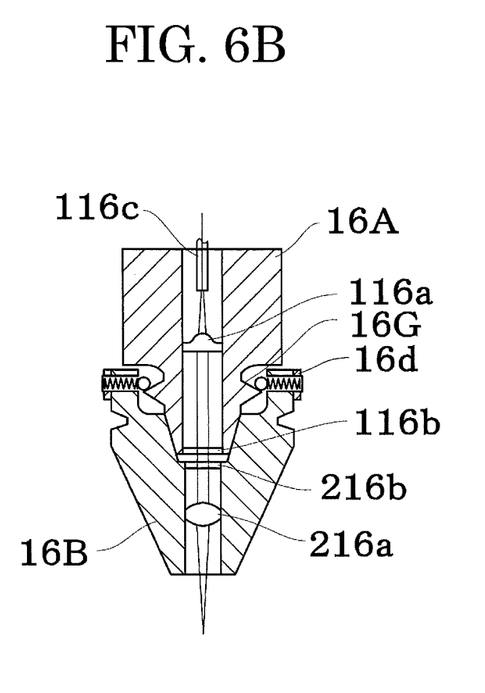
FIG. 6B illustrates a cross sectional view of a head portion of the laser machining head of FIG. 6A.

Referring to FIGS. 6A and 6B, another laser machining head according to a second embodiment is explained.

In FIGS. 6A and 6B, portions common to those of FIG. 3 remain the same reference alphanumeric identifiers, and the detailed explanation for such portions is omitted.

The present embodiment adopts a structure in which a laser beam condenser (referred to as a nozzle portion) 16B is mounted on a collimator 16A. More specifically, the ball plungers 16d are disposed at the laser beam condenser 16B' side and a chuck neck 16G is formed at the collimator 16A' side.

Next, a sub-crump structure of the attachment 19 will be explained.

Here, it should be noted that when the laser machining head 16 is made capable of being mounted on the tool main shaft 13 and the axis center of the tool main shaft 13 is made coincident with the laser beam axis, it becomes possible to control the laser machining head 16, as well as to control the mechanical machining tool T for linear and rotary motions.

In order to make the axis center of the tool main shaft 13 coincident with the laser beam axis, the laser machining head 16 is provided with a sub-clamp structure. Specifically, when the tool main shaft 13 that rotates the mechanical machining tool T is used as a tool holder, it is also necessary to have a secure positioning mechanism. Each of FIGS. 7A, 7B, 8A-8C, 9A, and 9B illustrates an exemplary sub-clamp mechanism which is mounted on one of the tool main shaft 13 and the attachment 19, in addition to the shank 19a of FIGS. 5A and 5B.

Figure 7A:
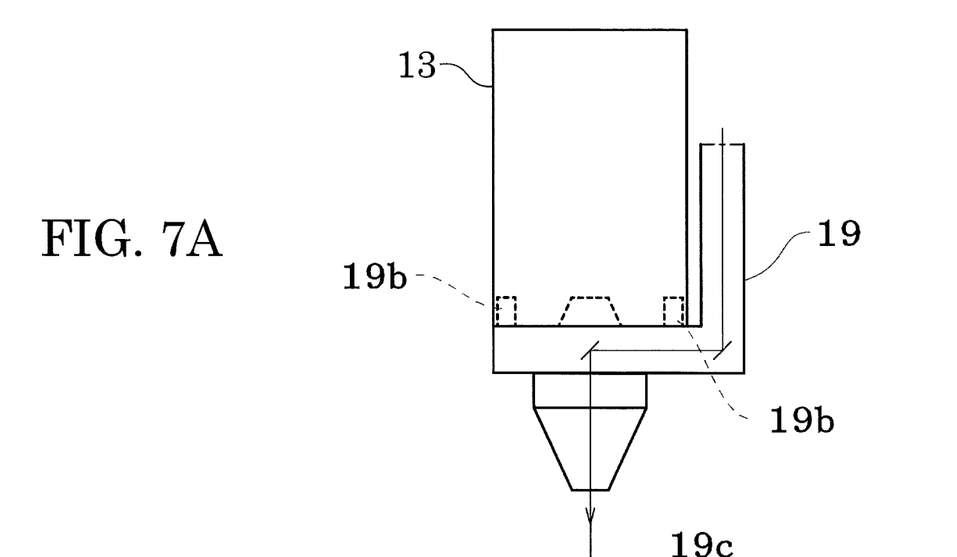
FIGS. 7A and 7B illustrate examples of a sub-clamp mechanism for clamping the laser machining head.

As illustrated in FIG. 7A, the attachment 19 is provided with pins 19b. The pins 19b are disposed at edge portions of surfaces of the attachment 19 where the attachment 19 is in contact with the tool main shaft 13. The tool main shaft 13 includes portions for clamping the pins 19b. Thus, the tool main shaft 13 is provided with a sub-clamp mechanism.

Figure 7B:
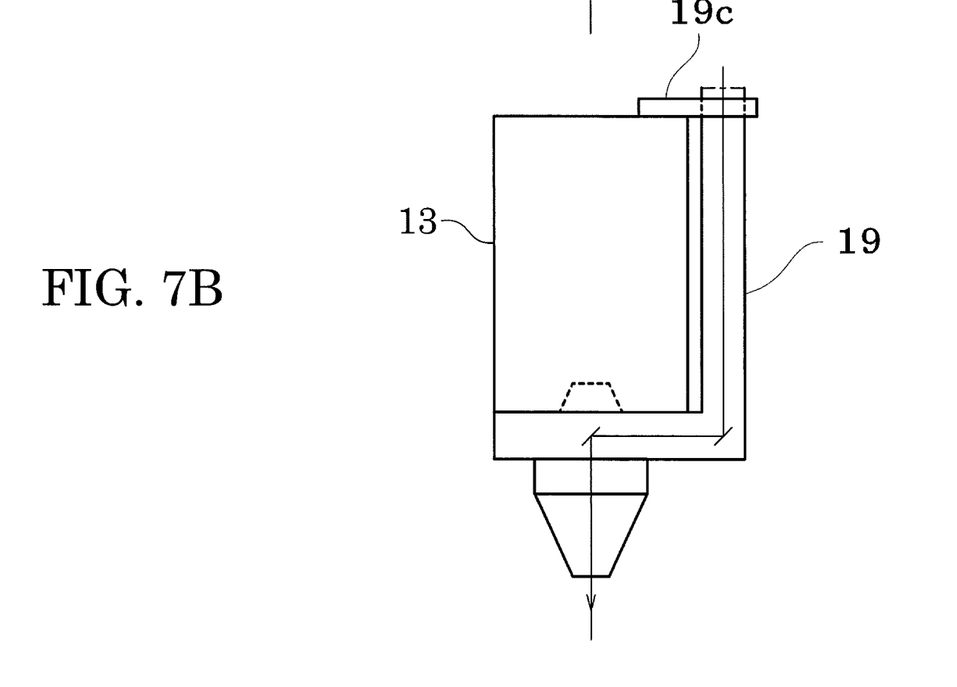

In FIG. 7B, the attachment 19 is provided with a sab-clamp device 19c. The sab-clamp device 19c is disposed at an upper portion of the attachment 19 and presses the tool main shaft 13 from the opposite surface so as to pinch the tool main shaft 13, thereby clamping the tool main shaft 13. In this case, the sub-clamp mechanism is provided to the attachment 19.

Figure 8A:
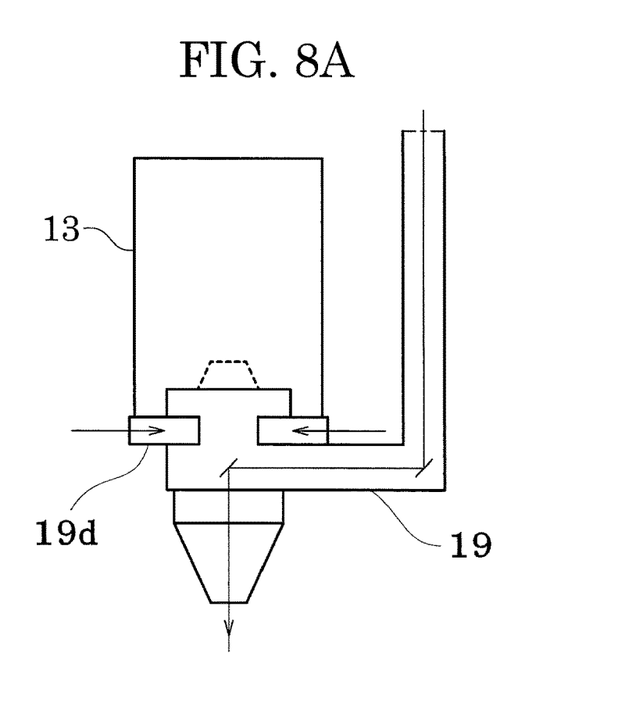
FIGS. 8A-8C illustrate other examples of a sub-clamp mechanism for clamping the laser machining head.
Figure 8B:
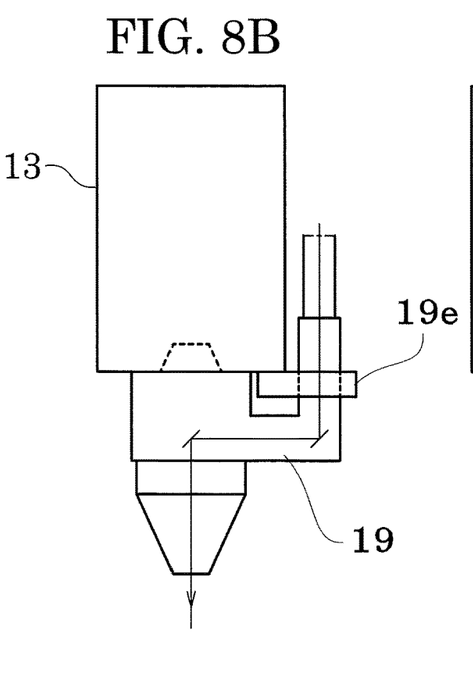
Figure 8C:
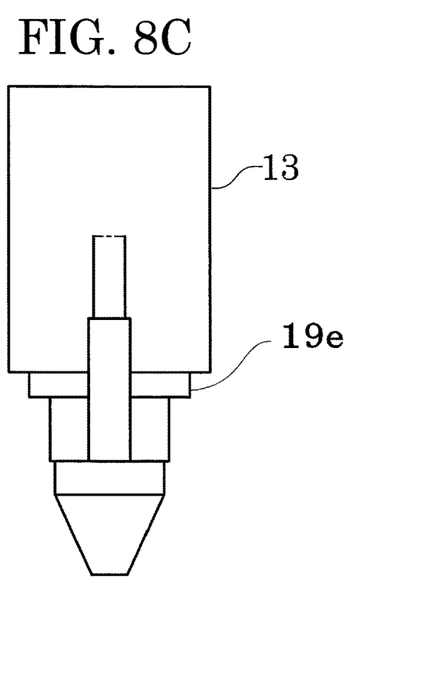

Alternatively, the attachment 19 is provided with a pair of sub-clamp portions 19d, as illustrated in FIG. 8A. The pair of the sub-clamp portions 19d are configured to slide along the surface of the tool main shaft 13 and to slide into grooves formed on the attachment 19. Thus, the laser machining head 16 is securely clamped. In FIGS. 8B and 8C, the attachment 19 is provided with a pair of sub-clamp portions 19e disposed at a lower part of the tool main shaft 13. As an example, the pair of the sub-clamp portions 19e are supported by the tool main shaft 13 and energized continuously in a closing direction by a spring or the like, for example. Thus, the pair of the sub-clamp portions 19e supported by the tool main shaft 13 clamps the attachment 19.

Figure 9A:
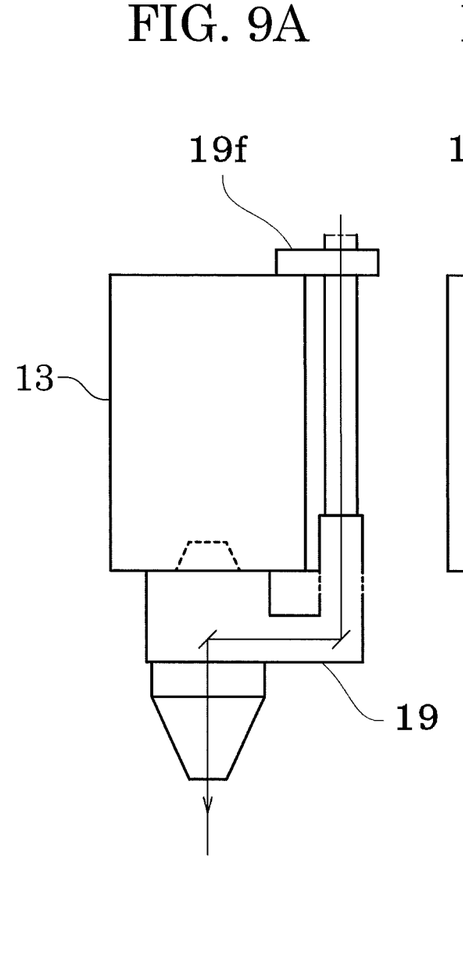
FIGS. 9A and 9B illustrate further other examples of a sub-clamp mechanism for clamping the laser machining head.
Figure 9B:
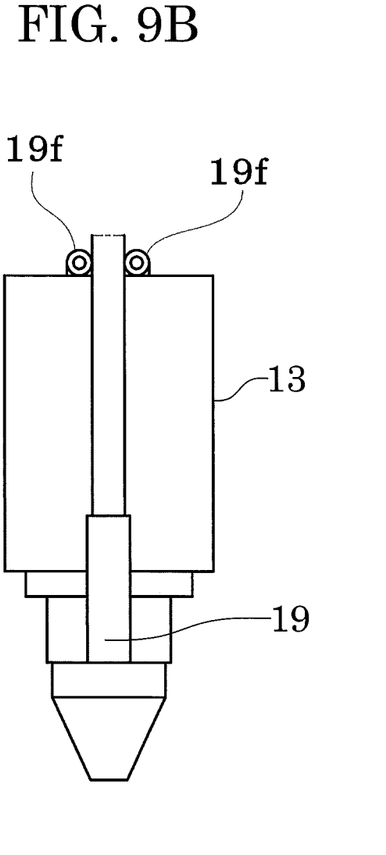

In FIGS. 9A and 9B, as another example, the attachment 19 is provided with a pair of roller sub-clamps 19f. The pair of the roller sub-clamps 19f are supported by the tool main shaft 13 and energized continuously in a closing direction by a spring or the like, for example. Thus, the pair of the roller sub-clamps 19f supported by the tool main shaft 13 clamps the attachment 19.

When the tool main shaft 13 starts rotation at a speed relatively high, it may cause torsion; however, the pair of the roller sub-clamps 19f accommodates such torsion.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within the scope of this invention.

What is claimed is:

1. A combined machining apparatus, comprising:
   a tool holder;
   a first automatic exchanger capable of containing at least one laser machining head and mounting the at least one laser machining head on the tool holder; and
   a second automatic exchanger capable of containing at least one mechanical machining tool and mounting the at least one mechanical machining tool on the tool holder, wherein:
   the at least one laser machining head includes (i) a collimator, which collimates a laser beam and includes three ball plungers disposed with 120° angular intervals along a circumference of a circle, and (ii) a plurality of light condensers having different focal lengths for the laser beam, each of the plurality of the light condensers including a circumferential groove and being attachable to and detachable from the collimator;
   the first automatic exchanger is capable of containing the plurality of the light condensers and mounting one of the plurality of the light condensers on the collimator when the at least one laser machining head including the collimator is held by the tool holder; and
   the three ball plungers of the collimator are biased to fit into the circumferential groove so as to align an axis center of the collimator with an axis center of each of the plurality of the light condensers and hold each of the plurality of the light condensers.

2. The combined machining apparatus according to claim 1, wherein:
   the at least one laser machining head includes a first shank for being held by the tool holder,
   the at least one mechanical machining tool includes a second shank for being held by the tool holder,
   the first shank includes a first portion to be held by the tool holder and the second shank includes a second portion to be held by the tool holder, and
   the first and second portions are formed in a common shape.

3. The combined machining apparatus according to claim 2, wherein the at least one laser machining head includes an attachment that forms a laser beam path and includes the first shank.

4. The combined machining apparatus according to claim 3, wherein the tool holder includes a tool main shaft for rotating the at least one mechanical machining tool, and the tool main shaft includes a sub-clamp for clamping the attachment.

5. The combined machining apparatus according to claim 3, wherein the tool holder includes a tool main shaft for rotating the at least one mechanical machining tool, and the attachment includes a sub-clamp for being clamped by the tool main shaft.

6. The combined machining apparatus according to claim 1, wherein the plurality of the light condensers correspond to different laser machining purposes including cutting, boring, welding, building, laminating, and surface modifying.

* * * * *